United States Patent [19]

Usumoto et al.

[11] Patent Number: 5,038,383
[45] Date of Patent: Aug. 6, 1991

[54] METHOD OF AND APPARATUS FOR PRODUCING CUTOUT MASK DATA

[75] Inventors: Hiroaki Usumoto; Ikuo Ohsawa, both of Kyoto, Japan

[73] Assignee: Dainippon Screen Mfg. Co., Inc., Japan

[21] Appl. No.: 416,843

[22] Filed: Oct. 4, 1989

[30] Foreign Application Priority Data

Oct. 7, 1988 [JP] Japan ................................ 63-254618

[51] Int. Cl.[5] .............................................. G06K 9/46
[52] U.S. Cl. ........................................ 382/16; 382/22; 382/33; 382/56; 358/452
[58] Field of Search ....................... 382/30, 32, 33, 16, 382/56, 22, 34; 358/452, 453, 464, 78

[56] References Cited

U.S. PATENT DOCUMENTS

| | | | |
|---|---|---|---|
| 4,021,778 | 5/1977 | Ueda et al. | 382/30 |
| 4,538,183 | 8/1985 | Kanno et al. | 358/452 |
| 4,672,459 | 6/1987 | Kudo | 358/452 |
| 4,733,304 | 3/1988 | Homma et al. | 358/452 |
| 4,868,884 | 9/1989 | Miyazaki et al. | 382/32 |

*Primary Examiner*—Michael Razavi
*Assistant Examiner*—Yon Jung
*Attorney, Agent, or Firm*—Ostrolenk, Faber, Gerb & Soffen

[57] ABSTRACT

Cutout mask data is easily obtained while setting small unit areas in an original image and displaying them in order on a display unit. Unit areas including vertexes of an outline of a cutout mask are first designated. Unit area images within the unit areas are simultaneously displayed on a display unit. An operator sequentially designates positions of the vertexes while watching the unit area images arrayed in order of the designation. Cutout mask data are formed on the basis of the positions of the vertexes.

15 Claims, 8 Drawing Sheets

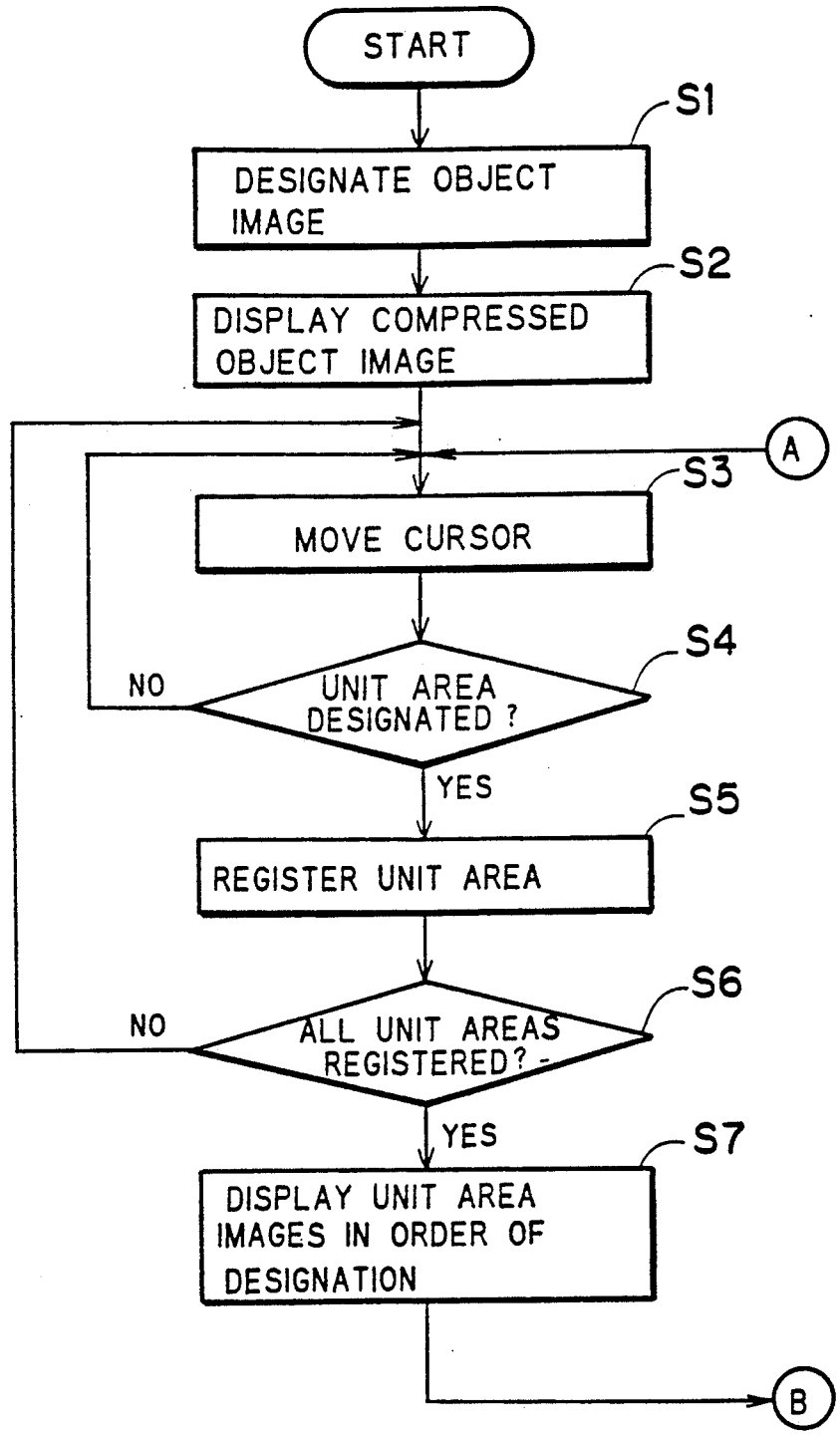

METHOD OF AND APPARATUS FOR PRODUCING CUTOUT MASK DATA

BACKGROUND OF THE INVENTION

1. Field of the Invention

The present invention is related to a method of and apparatus for producing cutout mask data which are employed to extract or eliminate a cut-out area within an original image.

2. Description of Related Art

A typical picture of commodities used as an original for producing printed matter, such as a catalogue or the like, has a background other than the commodities themselves. The printed matter, in contrast usually shows only the commodities without the background.

A cutout mask is employed to remove the background area (or a cut-out area) from the original. The cutout mask is a film which is opaque in the cutout area and transparent in the remaining part of the original. A reproduced image without the background is produced by photographic reproduction while laying the cutout mask over the original or a fully-reproduced image of the original. Another type of cutout mask whose transparent and opaque portions are reversed is employed when the background is replaced with an other picture image.

In an image processing apparatus known as a color page make-up system, the cutout mask is treated as one of several images and is represented by image data (cutout mask data); the reproduced image without the background is represented by image data which are produced by processing the cutout mask data and original image data depicting the original. The method of producing cutout mask data in an image processing apparatus is described in the Japanese Patent Publication Gazettes Nos. 1985-13178 and 1985-5747 disclosed by the applicant of the present invention, for example.

The cutout mask data is usually produced by displaying the original image on a displaying device, and manually designating an outline of the cutout area within the original image with a digitizer or the like. Further, an image compression operation, which is performed by skipping pixels at regular intervals in the original to collect compressed image data, e.g., skipping pixels with interpolation and the like, may be applied in the production of the cutout mask data; this enables the displaying device to show the whole original image at a time when the total number of pixels in the original image is larger than that of the displaying device.

However, on the compressed image, the outline of the cutout area is hard to designate precisely because some of the pixels of the original image are omitted in the compressed image. In order to precisely designate the outline, a method in which a partial image of the original is displayed without image compression i.e., displayed at actual resolution is often applied. In this method, a plurality of partial images which cover the outline of the cutout area is first designated by an operator while the compressed image of the whole original is displayed. One of the plurality of partial images is displayed at actual resolution on the displaying device, and the operator designates a part of the outline; similar processing is repeated for all of the plurality of partial images. In a similar method, at every time the processing is finished for one partial image, the next partial image is specified on the compressed image, or the position of the next partial image is designated by a direction and a distance from the current position.

According to the foregoing conventional methods, an operator sometimes loses a relation between a part of the outline designated on the previous partial image and that designated on the current partial image. Further, because one partial image includes only a part of the cutout mask, it is sometimes difficult to locate the outline in it. Moreover, because the plurality of partial images are sequentially displayed, image data for respective partial images are inefficiently read out from a disc memory one by one to make a partial image; therefore, the process takes much time.

SUMMARY OF THE INVENTION

The present invention is directed to method of and apparatus for producing cutout mask data representing a cutout mask which is employed for extracting or eliminating a cutout area from an original image. The method comprises the steps of (a) preparing an original image; (b) compressing the original image to obtain a compressed image; (c) displaying the compressed image on a display means; (d) designating positions of a plurality of unit areas each of which has a prescribed shape on the compressed image in sequence; (e) finding a plurality of areas on the original image corresponding to the plurality of unit areas on the compressed image; respectively; (f) extracting respective images on the plurality of areas from the original image to obtain unit area images whose respective resolutions are no lower than a resolution of the original image; (g) displaying the unit area images arrayed in order of the sequence at the step (d) on the display means; (h) designating a plurality of points on an outline of the cutout area in sequence on the unit area images displayed on the display means; (i) serially connecting the plurality of points by segments according to a prescribed connection rule; to thereby form a closed loop; and (j) obtaining the cutout mask data on the basis of the closed loop.

According to an aspect of the present invention, the step (h) comprises the step of (h-1) cumulatively displaying respective positions of the plurality of points with a prescribed mark in the unit area images on the display means every time when each of the plurality of points is designated.

According to another aspect of the present invention, the connecting at the step (i) is executed every time when each of the plurality of points except a foremost point is designated at the step (h), to thereby form one of the segments, and the segments are cumulatively displayed in the unit area images on the display means.

Preferably the segments are redundantly displayed in each of the unit area images which include at least a part of the segments. The segments may be straight lines.

The original image may be a color image having a plurality of color components, and the unit area images may be obtained on the basis of at least one of the plurality of color components.

The compressed image may be displayed on the display means in addition to the unit area images.

Moreover, the plurality of points and the segments may be cumulatively displayed in the compressed image on the display means.

The unit area images may be displayed at the same resolution with the original image. Instead, the step (f) may comprise the steps of (f-1) extracting the respective images on the plurality of areas from the original image to obtain extracted images, and (f-2) expanding the extracted images by a prescribed expansion factor to obtain the unit area images.

Accordingly, an object of the present invention is to efficiently produce cutout mask data depicting a required cutout mask.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2A and FIG. 2B are flow charts showing the procedure of the preferred embodiment of the present invention.

DESCRIPTION OF THE PREFERRED EMBODIMENTS

Figure 1:
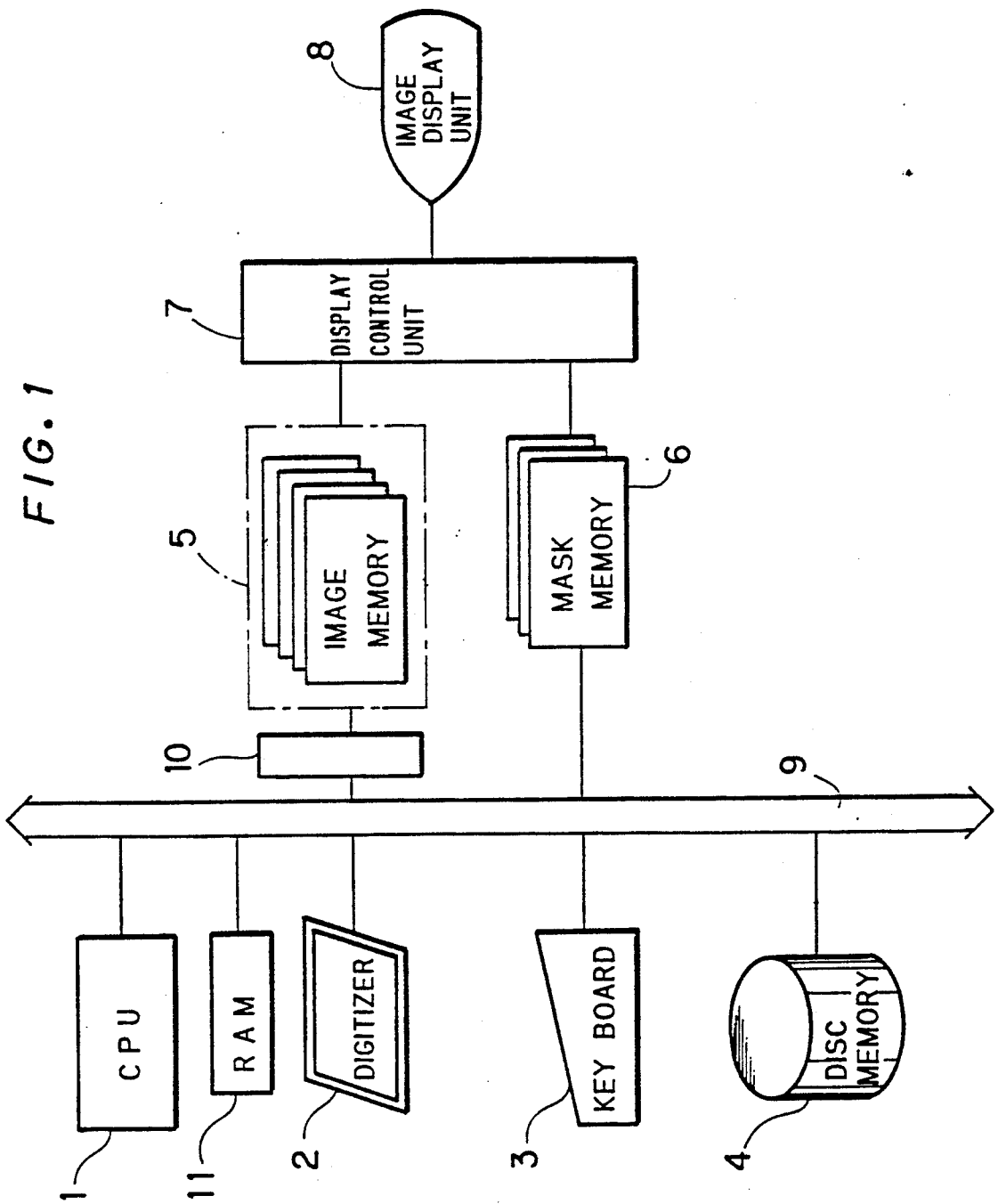
FIG. 1 is a block diagram showing the structure of an apparatus according to the present invention.

FIG. 1 is a block diagram showing the structure of an image processing apparatus for producing cutout mask data according to the present invention. The apparatus comprises a CPU 1, a digitizer 2, a key board 3, a disc memory 4, an image compression unit 10, a RAM 11 and a mask memory 6, which are interconnected through a bus 9. The image compression unit 10 compresses (or contracts) image data of an original at a prescribed compression rate in response to demand from CPU 1, and then transmits the compressed data to the image memory 5. The RAM 11 stores information about a unit area, and vector data, which will be described later. The image memory 5 and the mask memory 6 are respectively connected to an image display unit 8, such as a color CRT, through a display control unit 7, and such memories store data for displaying the images of the original, the cutout mask and so on.

Figure 2B:
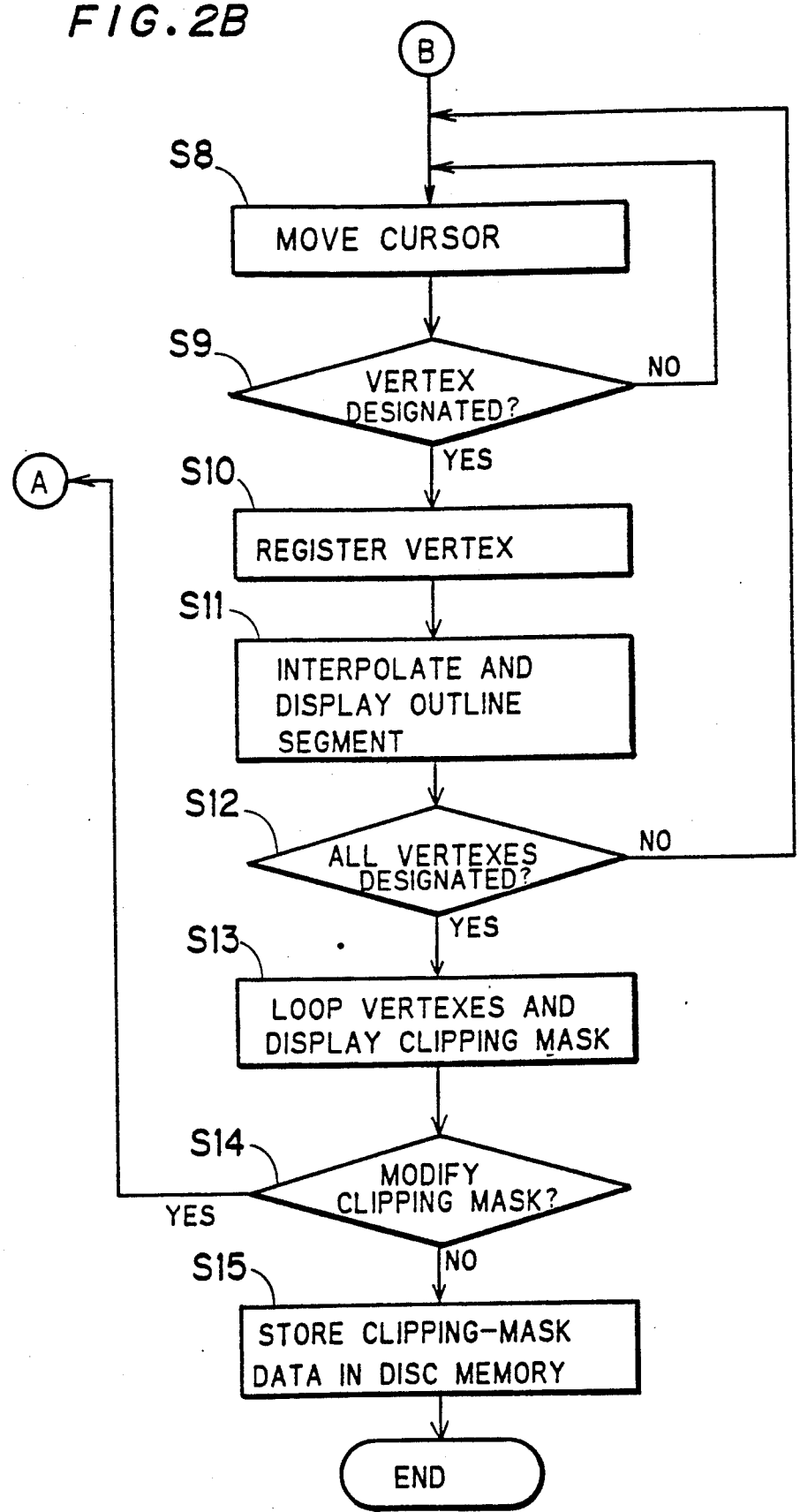

FIGS. 2A and 2B are flow charts showing the procedure of producing a cutout mask data. FIGS. 3A through 3F are explanatory diagrams showing examples of images at main steps of the procedure.

At a step S1, an operator designates an original image (or a subject image) subjected to the processing of producing a cutout mask data by means of the key board 3; this being performed by selecting in advance image data which stored in the disc memory 4. The selected image data is compressed in the image compression unit 10, and is stored in the image memory 5 thereafter. In this embodiment, the compression is achieved by skipping the selected image data. If the selected image data depicts a color image, respective color components for yellow (Y), magenta (M), cyan (C) and black (K) of the selected image data are stored in the image memory 5.

Figure 3A:
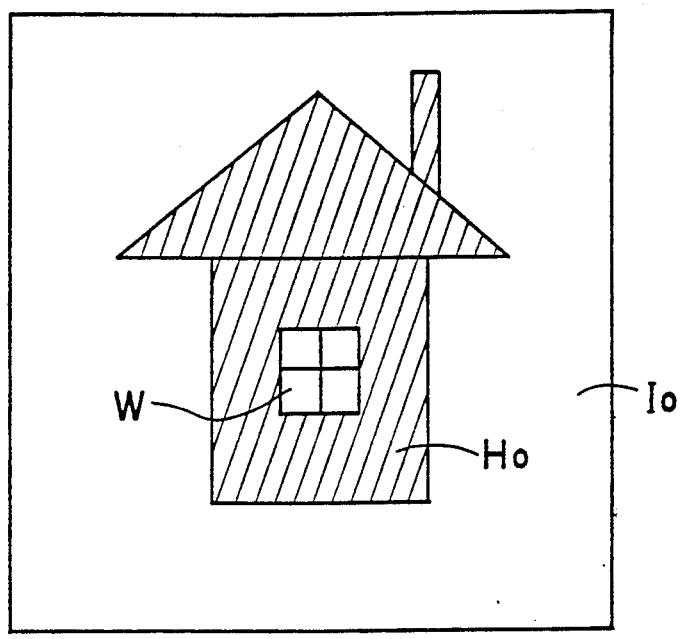
FIG. 3A through 3F, 4A, 4B and 5 are explanatory diagrams showing examples of images employed in the preferred embodiment.

At a step S2, the whole subject image is displayed as a compressed image (or a contracted image) on the image display unit 8 on the basis of the image data stored in the image memory 5. The display control unit 7 converts the image data with Y, M, C and K components into those with R, G and B components, to thereby display the subject image on the image display unit 8. The display control unit 7 also displays an image of a cutout mask with a prescribed color over the subject image on the image display unit 8 on the basis of image data stored in the mask memory 6. The image of the cutout mask may be displayed to be semitransparent. FIG. 3A illustrates a compressed image $I_0$ thus displayed. The compressed image $I_0$ includes a picture $H_0$ of a house having a window W. The area which is surrounded by the outline of the picture $H_0$ is to be that of a cutout mask.

Figure 3B:
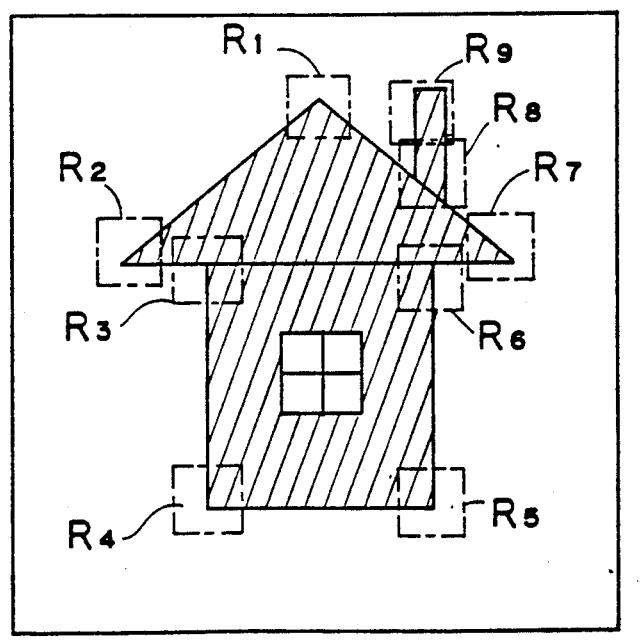

At a step S3, the operator moves a cursor on a picture plane of the image display unit 8 by means of the digitizer 2 and a stylus pen or a mouse (not shown). A position of a unit area is then designated by the operator. The unit area is employed at the next step S4 in designating the outline of the cutout mask. The unit area has a square shape of prescribed size whose center is located at the position of the cursor, for example. The designated unit area is, for example, indicated by coloring the frame thereof so that the designated unit area is easily recognized in the compressed image $I_0$. It is also effective to indiate the designated area by coloring or inversely coloring the unit area, or traslucently coloring the same. The information about the position and size of a unit area image which is an image within the unit area is registered in the RAM 11 at a step 5. By repeating the steps S3 through S6, a plurality of unit areas may be established in the subject image. FIG. 3B shows unit areas $R_1$ through $R_9$ thus sequentially established. As will be described later in detail, two adjacent vertexes of the outline of the cutout mask are connected to each other with a segment. If a subject area which is cause of a cutout mask—a cutout area corresponding to picture $H_0$ in FIG. 3A—is outlined only by line segments, unit areas are established at the vertexes of the cutout area.

Figure 3C:
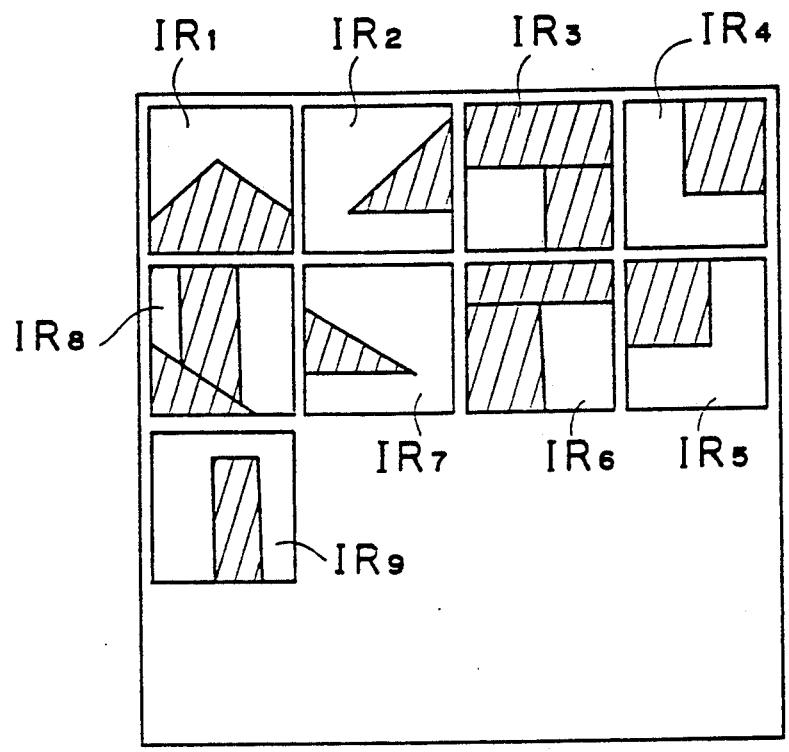

After all of unit areas $R_1$ through $R_9$ are registered, respective unit area images $IR_1$ through $IR_9$ of the unit areas $R_1$ through $R_9$ are read out from an original image file within the disc memory 4 to be displayed on the image display unit 8 at actual resolution, as shown in FIG. 3C. The unit area images are arrayed in order of the designation at the steps S3 through S6. A different pattern of the array other than that of FIG. 3C can be used; for example, the unit area images $IR_5$ through $IR_8$ in the second row from the top can be arrayed from the left to the right.

Figure 3D:
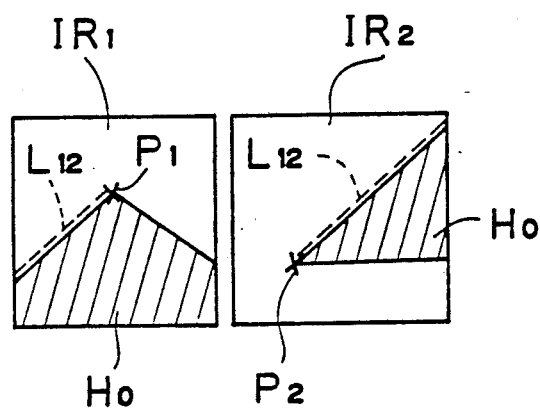

At steps S8 and S9, the operator moves the cursor on the picture plane by means of the digitizer 2 and a stylus pen or a mouse, and sequentially specifies positions of vertexes of the outline within the unit area images $IR_1$ through $IR_9$. Plural positions of the vertexes may be designated in each of the unit area images $IR_1$ through $IR_9$. Because the unit area images $IR_1$ through $IR_9$ are displayed at actual resolution and because one pixel is of about 0.4 mm square, for example, if the image display unit 8 is of 14-inch type, the vertexes of the outline can be precisely designated even by an unskilled operator. FIG. 3D shows a part of the display where two vertexes $P_1$ and $P_2$ of the outline are designated. The positions of the designated vertexes $P_1$ and $P_2$ are marked by "X" with a prescribed color. Positional data of the specified vertexes are registered in the RAM 11 at a step S10.

As for the first vertex of the outline, a step S11 is not executed but the processing returns from a step S12 to the step S8. When the second vertex $P_2$ of the outline is registered at the step S10, the CPU 1 computes (or interpolates) a segment between the vertexes $P_1$ and $P_2$ (or an outline segment) and displays the segment with a prescribed color on the picture plane. The outline segment $L_{12}$ thus displayed is shown by a broken line in FIG. 3D. The outline segment $L_{12}$ of FIG. 3D is drawn to be slightly shifted from an actual position which is located just on the outline of the cutout area $H_0$ for convenience of illustration.

Figure 4A:
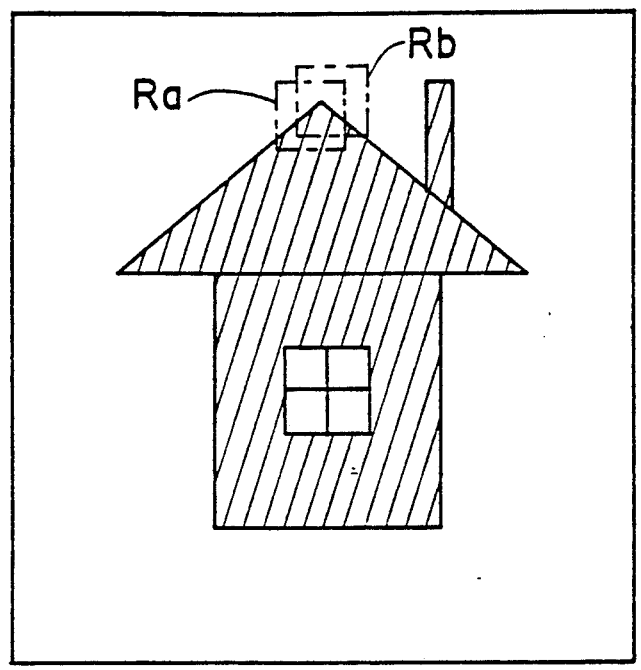
Figure 4B:
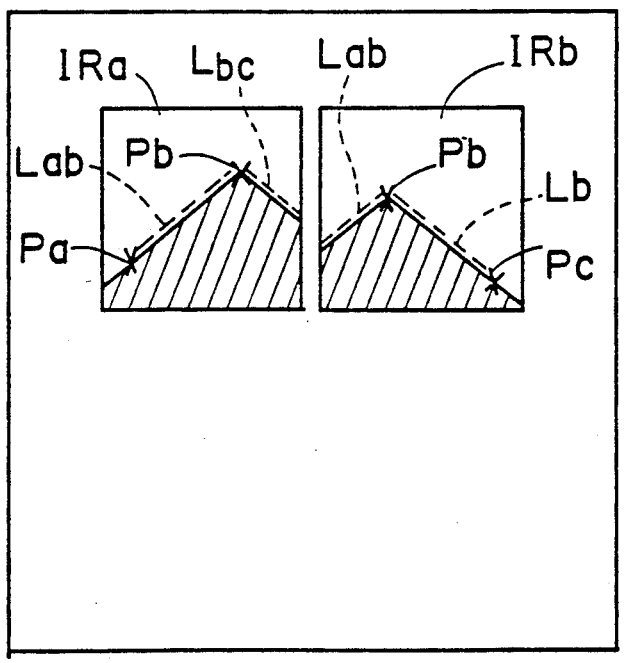

If one outline segment appears in more than one unit area image, the outline segment is displayed in all of such unit area images. FIGS. 4A and 4B illustrates a case where two overlapping unit areas $R_a$ and $R_b$ are designated and three vertexes $P_a$, $P_b$ and $P_c$ are sequentially designated. Outline segments $L_{ab}$ and $L_{bc}$ are redundantly displayed in both of the unit area images $IR_a$ and $IR_b$. In this case, the vertex $P_b$ can be designated in either of the unit area images $IR_a$ and $IR_b$.

Data representing the outline segment $L_{12}$ thus obtained is stored in a mask plane of the mask memory 6 in the form of a function representing the position of the outline segment $L_{12}$. The mask memory 6 has another mask plane for storing data representing the position of the vertexes $P_1$ and $P_2$ which are displayed by the mark "X" and still another mask plane for storing image data representing the cutout mask.

In every cycle of the steps S8 through S12, one outline segment is interpolated between a newly-designated vertex and a preceding vertex, and displayed on the unit area images. After all of the vertexes necessary to form the outline of a closed loop are designated, the operator orders the end of the designation with a keyboard 3 at the step S12. Then an outline segment $L_{111}$ between the first vertex $P_1$ and the final vertex $P_{11}$ is interpolated, whereby a closed-loop outline $L_c$ (shown by a broken line in FIG. 3F) is completed. The inside area surrounded by the closed-loop outline $L_c$ is the cutout mask M. Cutout mask data formed of coordinate data corresponding to the vertexes $P_1$ through $P_{11}$ are stored in the RAM 11, and display data corresponding to the cutout mask data are stored in the mask memory 6. The image of the cutout mask M is displayed together with the compressed image $I_0$. The image at this stage is the same as that shown in FIG. 3F except the marks "X". The image of the cutout mask M is uniformly colored with a specific color selected by the operator. The operator checks the image on the picture plane and returns the processing from the steps S14 to S3 to modify the cutout mask if necessary.

Figure 3E:
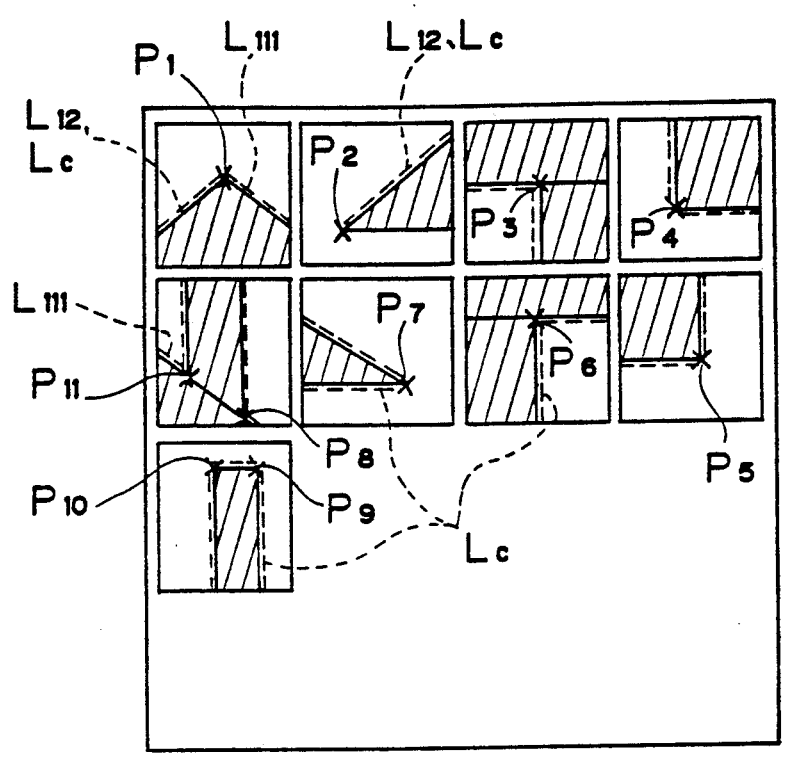
Figure 3F:
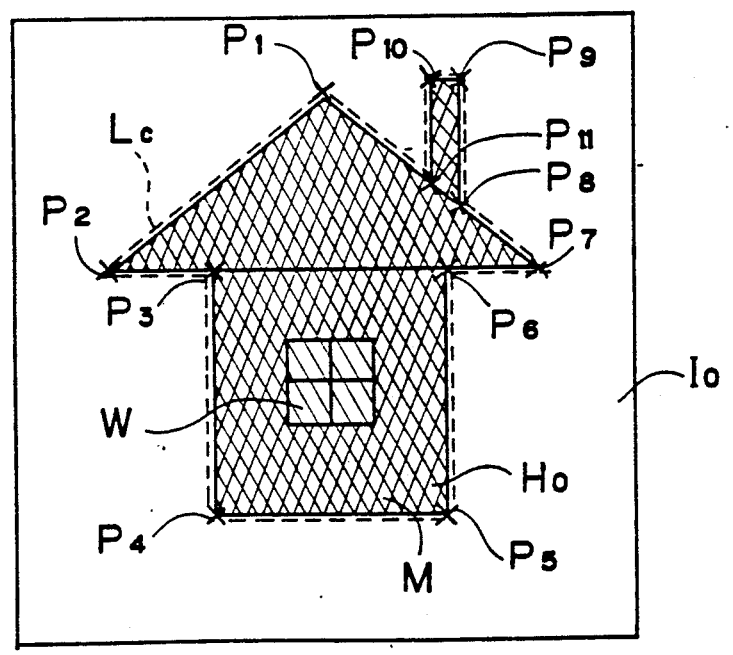

In a modification of the cutout mask, the cutout mask before the modification is displayed together with respective unit area images shown in FIG. 3C through FIG. 3E. If the inside of the window W is to be removed from the cutout mask M by the modification, the closed-loop outline of the window W is obtained according to the above-stated procedure of the steps S3 through S13, and the operator specfies that the inside of the window W is removed. Addition of the cutout mask area can be similarly performed.

After the modification of the cutout mask is completed, the cutout mask data, which essentially consist of coordinate data of the vertexs of the outline, and which are registered in the RAM 11, are stored in the disc memory 4 at a step S15. The cutout mask data may be stored in the form of bit-map data, run-length data or the like.

As described above, the unit area images $IR_1$ through $IR_9$ which are parts of the whole image area and which are needed in designating the vertexes $P_1$ through $P_{11}$ of the outline are arrayed in order on the image display unit 8; the operator sequentially designating the vertexes $P_1$ through $P_{11}$ while watching the unit area images $IR_1$ through $IR_9$ simultaneously. Therefore the operation of designating the vertexes is not suspended during change of the images on the picture plane of the image display unit 8, and is performed efficiently. Further, because the unit area images $IR_1$ through $IR_9$ can be small areas including the vicinity of the vertexes $P_1$ through $P_{11}$, the unit area images $IR_1$ through $IR_9$ can be displayed simultaneously at actual resolution. Therefore the operator can designate the vertexes $P_1$ through $P_{11}$ continuosly and precisely. The smallness of the unit area has another advantage of reducing the time required for reading out image data of the unit area images $IR_1$ through $IR_9$ from the disc memory 4 and then displaying the unit area images.

Figure 5:
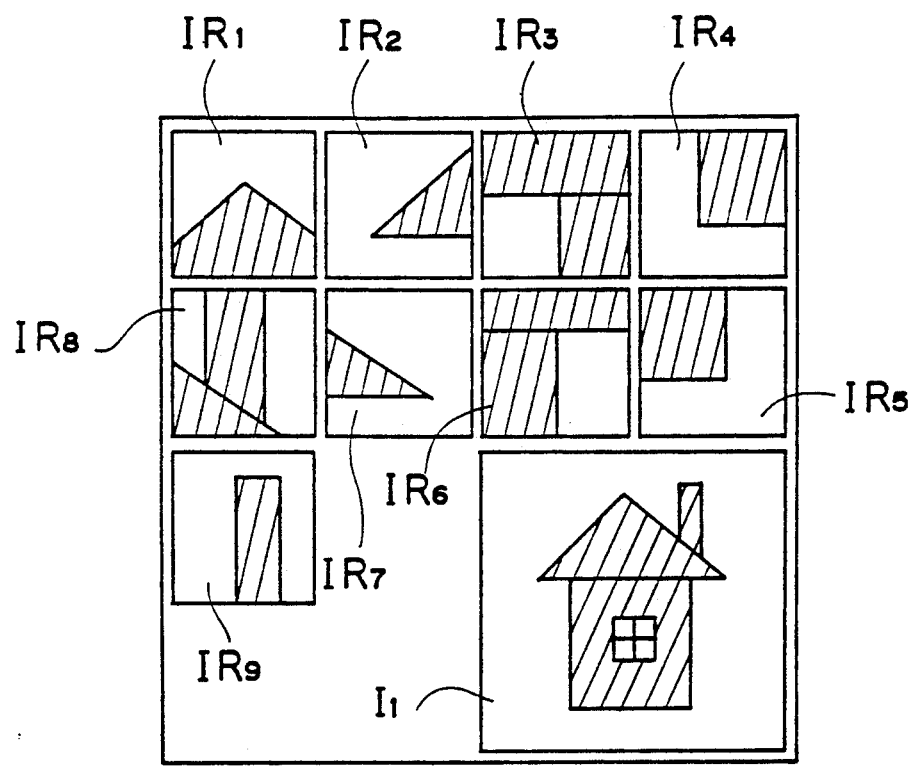

As shown in FIG. 5, an image $I_1$ which is further compressed from the image $I_0$ of FIG. 3A may be displayed together with the unit area images. The vertexes and outline segments may be displayed on the compressed image data $I_1$ as well as on the unit area images. This makes it easier for the operator to recognize the positions of the vertexes and the outline segments and increases the efficiency of the operation.

Although linear interpolation is employed to connect the adjacent vertexes in the above embodiment, another type of interpolation on the basis of a prescribed function representing a specific shape of interpolated line, such as an arc, may be employed instead.

Although the unit area images $IR_1$ through $IR_9$ are displayed at actual resolution, they may be expanded to be displayed when the number of unit areas is small.

When a large number of unit areas are designated and, therefore, area of the unit area would have to be small if they were displayed simultaneously, the number of unit area images to be simultaneously displayed at actual resolution can be limited. In this case, the apparatus may have a paging function: displaying several unit areas an a single page, designating the vertexes in the displayed unit areas, changing the display to show the unit areas an the next page and designating the vertexes in the newly-displayed unit areas; thus the operator can specify the vertexes continuously.

The apparatus may have an expansion display function to display an expanded unit area image on the image display unit 8; this makes it easier for the operator to designate the vertexes because one pixel of a unit area image at actual resolution is represented with a few pixels in the expanded image. Therefore, the operator can designate the vertexes a complicated outline more precisely. If all of the expanded unit area images cannot be displayed slimultaneously on the picture plane, the apparatus may have a smooth scroll display function which scrolls the displayed image on the picture plane by changing the first address of the displayed image which is read out from the image memory 5 to the image display unit 8 in response to order from the operator. The efficiency of the operation is maintained by employing the smooth scroll display function.

Each of the compressed image and the unit area images may be a four-color image synthesized from color separation images having Y, M, C and K components, or from one of the color separation images. This is because the outline of the cutout mask is sometimes easier to recognize in one of the color separation images than in the four-color image. The operator may select the color type of the displayed image by means of keyboard 3. Incidentally, the present invention may be also applied to monochrome images.

According to the present invention, the unit area images including the vertexes are displayed on the image display unit 8 in order of designation and the vertexes are sequentially designated on those unit area images; therefore the operator can designate the vertexes sequentially without changing the displaying images, and the cutout mask data is produced efficiently.

Since the interpolation of the adjacent vertexes of an outline is executed and the interpolated portions of the outline are displayed on each of the unit areas having the designated vertexes each time when one vertex is designated, the operator can easily recognize the specified part of the outline from the overall outline and efficiently designate the rest of the vertexes of the outline.

Although the present invention has been described and illustrated in detail, it is clearly understood that the same is by way of illustration and example only and is not to be taken by way of limitation. The spirit and scope of the present invention should be limited only by the terms of the appended claims.

What is claimed is:

1. A method of producing cutout mask data representing a cutout mask of the type which may be employed for extracting or eliminating a cutout area from an original image, the method comprising the steps of:
   (a) storing an original image;
   (b) compressing said original image to obtain a compressed image and storing said compressed image; said original image, and therefore said compressed image, having an outline which includes a plurality of vertexes;
   (c) displaying said compressed image;
   (d) designating the positions along said compressed image of a plurality of unit areas each of which encompasses at least one vertex and each of which has a prescribed shape;
   (e) displaying a plurality of unit area images separately from said compressed image, each unit area image showing a portion of said outline of said original image falling within an associated one of said unit areas with a resolution no less than that of said original image;
   (f) designating for each unit area image at least one point on said portion of said outline, at least one said point designated for each unit area image corresponding to a respective said vertex;
   (g) connecting said plurality of points by segments according to a prescribed connection rule to form a closed loop corresponding to said outline of said original; and
   (h) obtaining said cutout mask data on the basis of said closed loop;
   said designating step (f) comprising the step of cumulatively displaying respective positions of said plurality of points with a prescribed mark in said unit area images on said display means every time that another of said plurality of points is designated.

2. A method in accordance with claim 1, wherein said connecting step (q) is executed every time that another one of said plurality of points, except a firstmost point, is designated at said step (f), to thereby form one of said segments, said segments being cumulatively displayed in said unit area images.

3. A method in accordance with claim 2, wherein said segments are redundantly displayed in each of said unit area images which include at least a part of said segments.

4. A method in accordance with claim 3, wherein said segments are straight lines.

5. A method in accordance with claim 4, wherein:
said original image is a color image having a plurality of color components; and
said unit area images are obtained on the basis of at least one of said plurality of color components.

6. A method in accordance with claim 5, wherein said plurality of points and said segments are cumulatively displayed with reference to said compressed image.

7. A method in accordance with claim 6, wherein said unit area images are displayed at the same resolution as said original image.

8. A method in accordance with claim 1, wherein said step of displaying a plurality of unit area images comprises the steps of:
   (a) locating a plurality of areas on said original image corresponding respectively to said plurality of unit areas on said compressed image;
   (b) extracting respective images from said original image corresponding to said plurality of areas on said original image and displaying them as said plurality of unit area images with respective resolutions which are no lower than a resolution of said original image.

9. A method in accordance with claim 8, wherein said step of extracting respective images comprises the steps of:
extracting said respective images from said original image to obtain extracted images;
expanding said extracted images by a proscribed expansion factor to obtain said unit area images.

10. A method in accordance with claim 1, wherein said step of designating positions along said compressed image comprises the steps of designating said positions along said compressed image in sequence.

11. A method in accordance with claim 10, wherein said step of designating for each unit area image at least one point on said portion of said outline is carried out by designating said points in sequence.

12. A method in accordance with claim 1, wherein said plurality of unit area images are displayed separate in time from said compressed image.

13. A method in accordance with claim 1, wherein said plurality of unit area images are displayed at the same time as said unit area images but at locations separate from said unit area images.

14. A method in accordance with claim 1, wherein each of said vertexes is located in one or more of said unit areas.

15. An apparatus for producing cutout mask data representing a cutout mask of the type which may be employed to extract or eliminate a cutout area from an original, said apparatus comprising:
   (a) means for storing an original image;
   (b) means for compressing said original image to obtain an compressed image; said original image and therefore said compressed image, having an outline which includes a plurality of vertexes;
   (c) means for storing said compressed image;
   (d) means for displaying said compressed image;
   (e) means for permitting an operator to designate positions along said compressed image of a plurality of unit areas each of which encompasses at least one vertex and each of which has a proscribed shape;
   (f) means for displaying a plurality of unit area images separately from said compressed image, each unit area image showing a portion of said outline of said original image falling within an associated one of said unit areas with a resolution no less than that of said original image;

(g) means for enabling an operator to designate, for each unit area image, at least one point on said portion of said outline;

(h) means for connecting said plurality of points by segments according to a proscribed connection rule to form a closed loop corresponding to said outline of said original; and (i) means for obtaining said cutout mask data on the basis of said closed loop;

said means (q) including means for cumulatively displaying respective positions of said designated plurality of points with the prescribed mark in said unit area images on said display means every time that another of said plurality of points is designated.

* * * * *